United States Patent [19]

Taskinen

[11] Patent Number: 5,223,303
[45] Date of Patent: Jun. 29, 1993

US005223303A

[54] HARD CANDIES CONTAINING XYLITOL AND OTHER SUGAR ALCOHOLS HAVING REDUCED TACK

[75] Inventor: Sakari Taskinen, Turku, Finland

[73] Assignee: Huhtamaki Oy, Turku, Finland

[21] Appl. No.: 779,476

[22] Filed: Oct. 18, 1991

[30] Foreign Application Priority Data

Oct. 18, 1990 [FI] Finland .................................. 905133

[51] Int. Cl.⁵ ............................................. A23G 3/00
[52] U.S. Cl. .................................. 426/660; 426/804; 426/548; 426/658
[58] Field of Search ............... 426/660, 658, 548, 804

[56] References Cited

U.S. PATENT DOCUMENTS

| | | | |
|---|---|---|---|
| 4,153,732 | 5/1979 | Muhler et al. | 426/660 |
| 4,292,337 | 9/1981 | Andersen | 426/573 |
| 4,311,722 | 1/1982 | Vink et al. | 426/660 |
| 4,528,206 | 7/1985 | Kastin | 426/660 |
| 4,741,905 | 5/1988 | Huzinec | 426/660 |
| 4,753,816 | 6/1988 | Vink | 426/660 |
| 4,820,544 | 4/1989 | Barcelon et al. | 426/660 |
| 4,883,685 | 11/1989 | Kondou | 426/660 |
| 5,017,400 | 5/1991 | Olinger et al. | 426/660 |
| 5,045,340 | 9/1991 | Kohler | 426/660 |
| 5,063,080 | 11/1991 | Kruger et al. | 426/660 |

FOREIGN PATENT DOCUMENTS

| | | |
|---|---|---|
| WO91/07100 | 5/1991 | PCT Int'l Appl. |
| 1526020 | 9/1978 | United Kingdom . |
| 1583573 | 1/1981 | United Kingdom . |

OTHER PUBLICATIONS

Barnett, C., The Art And Science of Candy Manufacturing, Books For Ind. Pub, N.Y. 1978 pp. 18-19.

Primary Examiner—Jeanette Hunter
Attorney, Agent, or Firm—Mason, Fenwick & Lawrence

[57] ABSTRACT

Crystalline xylitol is added to a melt containing xylitol and other sugar alcohols, such as maltitol, lactitol, and hydrogenated glucose syrup. By careful control of temperature and the amounts of crystalline xylitol added to the molten mixture, hard candies with low tack and good dimensional stability result.

9 Claims, No Drawings

HARD CANDIES CONTAINING XYLITOL AND OTHER SUGAR ALCOHOLS HAVING REDUCED TACK

FIELD OF THE INVENTION

The present invention is directed to hard confectionery products, and a process for preparing same, which contain primarily sugar alcohols and include substantial amounts of xylitol, and in particular is directed to hard candies containing xylitol and other sugar alcohols, and a method of forming same, which have good texture and low tack.

BACKGROUND OF THE INVENTION

Hard candies, otherwise known as hard boiling candies, traditionally have been prepared from a mixture of saccharose and glucose syrup; water is evaporated from the mixture and the resulting concentrated mass is formed into candies by mold casting or by use of a candy forming apparatus, such as a drop roller machine. The hard candy which results has a "glass like" appearance and low surface tack or stickiness; however, saccharose and glucose syrup are known to be cariogenic, and also cause an almost immediate increase in blood sugar levels after ingestion. Therefore, it has been desired to replace saccharose and glucose syrup with sugar substitutes which are less harmful to the teeth, which do not cause as sharp an increase in blood sugar levels, which are sweeter, or which are absorbed slower from the digestive tract so as to not cause as great an increase in weight as ingestion of equal quantities of glucose.

Sugar alcohols, such as sorbitol, mannitol, maltitol, and xylitol, are polyols, and are important sugar substitutes. Sorbitol, mannitol, and maltitol are considerably less sweet than saccharose, and xylitol has about the same sweetness as saccharose. The sugar alcohols are converted to fructose after ingestion, which does not require insulin to facilitate its entry into the cells; while the metabolism of fructose does require insulin, this step wise metabolism results in a damping out of the peaks in blood sugar levels which result from ingesting saccharose or glucose.

Studies have shown about a 30% reduction in dental carries in rats on sorbitol and mannitol diets, and virtually complete elimination of carries in rats when on xylitol diets. Therefore, it is highly desirable to produce candies containing xylitol and other sugar alcohols. (For more information on sweeteners, and sugar alcohols in particular, see pp. 917-922 of the *Van Nostrand Reinhold Encylopedia of Chemistry*, 4th Ed., edited by Considine, New York, 1984.) All patents, articles, or other printed information mentioned herein is incorporated by reference as if reproduced in full hereinbelow, inclusive of Finnish Patent Application 905133.

Attempts have been made to produce candies formed primarily of xylitol. For example, Finish Patent No. 61,265, corresponding to Great Britain Patent No. 1,583,573 discloses the production of hard caramels by adding 10%-30% by weight of powdered xylitol to a xylitol melt while the melt is maintained at a temperature not substantially exceeding xylitol's melting point of 93° C.-95° C.; the xylitol powder can be added to the xylitol melt at temperatures below the melting point of xylitol, provided that a melt is still present. The powdered xylitol used is limited to powder with an average particle size of about 40 microns to 150 microns. The mixture of xylitol powder with the xylitol melt is poured into small forms corresponding in shape and size to the desired caramels. However, the process is not continuous, and it is technically difficult to realize, so that the process is not well suited for industrial production of candy. Further, the resulting candies do not have the desired textural qualities, such as low tack, and good dimensional stability of the candy shape. This is believed to be due to the candy being comprised primarily of xylitol, which does not provide suitable physical characteristics to the candy when used in such high proportions.

Finish Patent Application No. 885,397, corresponding to published European Patent Application No. 0,370,761, discloses the production of hard confectionery products containing 45%-65% by weight xylitol, which are produced by heating a mixture containing 5%-20% by weight of xylitol, 85%-70% by weight maltitol or lactitol, less than 15% by weight of other sugar alcohols, and small amounts of water, to a temperature ranging from 170° C. to 175° C., allowing the melt to cool to a temperature between 105° C. and 120° C., and subsequently rapidly adding 30%-60% powdered xylitol by weight of the final hard confectionery composition while mixing and rapidly cooling the mixture. The molten sugar alcohols can also be combined with the powdered xylitol at temperatures below 90° C. or below 65° C,. and the mix is then shaped or rolled. The resulting product is highly hygroscopic, and the candies do not maintain their shape (have poor dimensional stability) and are perishable.

Finish Patent No. 61,392, corresponding to Great Britain Patent No. 2,526,020, notes that xylitol has poor tableting characteristics, since tablets made by pressing grains of xylitol together are too soft and friable. However, by dry blending xylitol with another polyol, such as sorbitol, and a tableting lubricant, such a calcium or magnesium stearate, stable tablets are formed. However, the dried tablets do not have the glass like confectionery texture of hard candies, and are not a homogenous mixture at the molecular level, being a dry blended mixture of grains of xylitol and another sugar alcohol.

Generally, when xylitol is used to prepare candy, a problem is presented by the inability to treat a xylitol melt with a traditional roller machine; this is primarily due to xylitol's inability to crystallize satisfactorily. Further, hard boiling candies formed from a mixture containing xylitol combined with other sugar alcohols, are usually extremely hygroscopic and sticky.

Thus, there is a need for hard candies formed of xylitol combined with other sugar alcohols, which can be formed using traditional drop roller machines or other traditional forming equipment and which are not hygroscopic and sticky. Further, there is a need to produce hard candies containing xylitol mixed with other sugar alcohols which maintain their shape.

Therefore, it is a primary object of the present invention to prepare hard candies containing xylitol and other sugar alcohols which maintain their shape and have low tack.

It is a further object of the present invention to form hard candies containing xylitol combined with other sugar alcohols which can be worked into the desired shape by conventional means.

SUMMARY OF THE INVENTION

The aforementioned exemplary objects and other objects of the present invention are achieved by the hard candies of the present invention formed by the process of the present invention. It has been discovered that, by adjusting the ratio of crystallized or powdered xylitol added to a melt of xylitol combined with other sugar alcohols and by careful control of mixing conditions, such as the amount of xylitol added in a stepwise fashion, and the temperature at which the powdered xylitol is mixed with a molten mixture of xylitol and other sugar alcohols, that hard candies can be formed using conventional forming means, such as drop roller machines, with the resulting candy pieces being non-sticky with good shape dimensional stability.

A preferred inventive process involves the combination of xylitol with at least one other sugar alcohol, preferably combined with other additives (e.g., emulsifiers, et cetera), and heating of this first mixture to at least the mixture's melting point. Upon melting and thorough mixing of the initial ingredients, the mixture is cooled to just below the melting point of xylitol, and coarse xylitol is admixed while maintaining the mixture at a temperature just beneath the melting point of xylitol. After more thorough mixing, the composition obtained is worked into the desired shape by conventional means, such as by use of a drop roller machine.

In a preferred, non-limiting, embodiment, with weight percentages calculated from the final weight of the candy, an initial or first mixture is formed of 2%–10% by weight of xylitol, 45%–75% by weight of other sugar alcohols, such as but not limited to maltitol and lactitol, and up to 0.5% by weight of an emulsifier. The first mixture is heated to its melting point and then cooled to about 110° C. to 120° C., and an additional 10%–20% by weight of coarse xylitol is mixed in, while keeping the mixture molten during mixing to form a second mixture. The second mixture is then cooled to about 92° C. and 2%–10% of xylitol is admixed to form a third mixture, followed by the addition of a mixture containing 2%–10% by weight of xylitol, 0.5% by weight of fat and flavoring to form a fourth mixture. An additional 10%–20% by weight of coarse xylitol is then admixed, with the weight percentages calculated from the final weight of the mixture, while maintaining the mixture at 92.C to form a fifth mixture (ratio of molten xylitol to crystalline xylitol added between 0.3 and 2.14). The fifth mixture obtained is then worked into the desired shape by conventional means, preferably using a drop roller machine.

In a preferred embodiment the coarse or powdered xylitol and/or coarse xylitol containing mixture (sixth mixture), which is added to molten mixture, is preheated, preferably about to 45° C. It has been surprisingly discovered that the preheating not only facilitates mixing, but reduces the hygroscopicity of the final product. Other additives, such as those generally used in the confectionery industry, may be added to improve the workability of the mixture For example, emulsifiers, such as but not limited to glycerol monostearate and lecithin may be added, and fat and flavoring can be added to improve the texture and taste of the final product.

DETAILED DESCRIPTION OF THE PREFERRED EMBODIMENTS

Xylitol and other ingredients used herein are conventionally available. Hydrogenated glucose syrup is available from Roquette Freres, of France, and is sold under the tradename Lycasin; more detailed information on Lycasin is available from Roquette Freres in its Lycasin 80/55 Technical Bulletin. Lycasin brand hydrogenated glucose syrup generally has a dry substance content of 75% +/−1%.

Various confectionery compositions were formed; the ratio of coarse or crystalline xylitol added to a xylitol-containing melt was varied in some of the mixtures. Generally, at least some crystalline xylitol was added to a xylitol-containing melt held at a temperature not substantially exceeding xylitol's melting point or slightly below xylitol's melting point (or a temperature sufficient to keep the mixture molten). It has been surprisingly discovered that by careful control of the ratio of crystalline xylitol added to a xylitol containing melt, when the melt is held at a temperature not substantially exceeding xylitol's melting point or slightly below xylitol's melting point, that the resulting candy pieces have good dimensional stability and have lower tack than candies containing the same ingredients but which have too high a ratio of molten xylitol to crystalline xylitol when the two are mixed at a temperature not substantially exceeding the melting point of xylitol. It has further been discovered that holding the temperature of the xylitol containing melt above 60° C. but below a temperature which does not substantially exceed xylitol's melting point during stepwise addition of crystalline xylitol to the melt will help the mass remain homogenous so that uniform candy pieces having good dimensional stability and low tack can be formed. This is unlike prior art processes which allowed for the mixture of crystalline and molten xylitol combined with other sugar alcohols to cool in an uncontrolled fashion during mixing.

EXAMPLES

The following non-limiting examples provide specific methods for preparing the xylitol containing hard candies of the present invention. All technical and scientific terms used herein have the same meaning as commonly understood by one of ordinary skill in the art. Other methods and materials similar or equivalent to those described herein can be used in the practice or testing of the present invention.

EXAMPLE 1

Sugar alcohols and an emulsifier were combined as follows:

| | |
|---|---|
| Lycasin | 25 kg; |
| xylitol | 1.2 kg; and |
| glycerol monostearate | 0.1 kg. |

The above mixture was heated to 175° C., and cooled in a vacuum to 120° C. The molten mixture was then transferred to a heating table, and allowed to cool to 110° C., at which time 5.0 kg of coarse xylitol was added with continued thorough mixing. The temperature of the molten mixture was not allowed to drop below 95° C. throughout the mixing step in order to ensure that the xylitol would melt. The molten mixture was then cooled to 92° C. and admixed with 1.0 kg coarse xylitol, which had been preheated to 45° C. prior to mixing. Immediately following the addition of the preheated coarse xylitol to the molten mixture, the following premixed composition was added to the molten mixture with rapid mixing:

| xylitol | 1.0 kg; |
| molten coconut butter | 0.2 kg; and |
| flavoring | 0.1731 kg. |

An additional 5.1 kg of coarse xylitol, preheated to 45° C., was combined with the molten mixture under rapid mixing to form a homogeneous mass (ratio of molten xylitol to crystalline xylitol of @0.87). Mixing was carried out while ensuring that the temperature of the mixture was at least 60° C.

The thoroughly mixed ingredients were then cooled to 45° C. to 50° C., and worked with a traditional drop roller machine into candies having the desired shape. The candy "centers" obtained were non-sticky and had good dimensional stability so that their shape was not easily deformed.

The centers (having a xylitol content of @35%) were then processed by hard-panning with xylitol until candies were formed having a total xylitol content of 50%. The candies may optionally be polished following the hard panning step Preferably, hard panning with xylitol is carried out by wetting the centers in a pan containing a 72% xylitol solution to which a 6% gum arabic solution (50% aqueous solution) has been added as a thickening agent. After the coated centers are dried, the wetting and drying steps are repeated until the desired xylitol content is obtained for the final product.

EXAMPLE 2

An initial mixture was formed from the following ingredients:

| Lycasin | 24.2 kg; |
| xylitol | 2.12 kg; and |
| glycerol monostearate | 0.09 kg. |

The intitial mixture was heated to 175° C., and following this boiling step, the ingredients were cooled in a vacuum to 120° C. (hence the term hard boiled or hard boiling candies). The molten mixture was then transfered to a heating table, allowed to cool to 110° C., and 6.68 kg coarse xylitol was added with continued thorough mixing, while maintaining the mixture at a temperature above 95° C. in order to ensure that the xylitol melted. The molten mixture was then cooled to 92° C., and 1.0 kg of coarse xylitol, preheated to 45° C., was admixed. Immediately following the addition of the preheated xylitol, the following premixed composition was added to the molten mixture under rapid mixing:

| xylitol | 1.0 kg; |
| molten coconut fat | 0.2 kg; and |
| flavoring | 0.1731 kg. |

An additional 7.35 kg of coarse xylitol, preheated to 45° C., was combined with the molten mixture under rapid mixing to form a homogeneous mass (ratio of molten xylitol to crystalline xylitol of @0.94). Mixing was carried out so that, at the conclusion of the mixing step, the mass was at a temperature of at least 60° C.

The well-mixed composition was then cooled to 45° C. to 50° C., and worked with a traditional drop roller machine into candies having the desired shape. The candy pieces were non-sticky and had good dimensional stability.

EXAMPLE 3

An initial mix was formed of the following ingredients:

| Lycasin | 24.5 kg; |
| xylitol | 5.3 kg; and |
| glycerol monostearate | 0.09 kg. |

The initial ingredients were heated to 175° C., and cooled in a vacuum to 120° C. The heated mixture was then transferred to a heating table, allowed to cool to 110° C., and 1.6 kg of coarse xylitol was added while thoroughly mixing the ingredients. During mixing, the temperature were held at a temperature in excess of 95° C. in order to ensure that all of the xylitol melted. The molten mass was then cooled to 92° C.

An additional 1.0 kg of coarse xylitol, preheated to 45° C., was then combined with the molten mass, and immediately after this, the following premixed composition was added to the mixture with rapid mixing:

| xylitol | 1.0 kg; |
| molten coconut fat | 0.2 kg; and |
| flavoring | 0.1731 kg. |

An additional 5.0 kg of pre-heated coarse xylitol was added with rapid mixing to form a homogeneous mixture (ratio of molten xylitol to crystalline xylitol of @0.99). The mixing steps were carried out so that, at the conclusion of mixing, the mixture had a temperature of at least 60° C.

The thoroughly mixed ingredients were then cooled to 45° C. to 50° C. However, the mass obtained was extremely sticky and very difficult to work with a traditional drop roller machine The candy pieces formed stuck to each other and had poor dimensional stability so they could not maintain their shape.

EXAMPLE 4

An initial ingredient mix was formed as follows:

| Lycasin | 24.5 kg; and |
| xylitol | 1.9 kg. |

The ingredients were heated to 175° C. and cooled in a vacuum to 120° C. While continuing to mix the molten mixture, 5 kg of coarse xylitol were added, while maintaining the mixture at a temperature above 95° C. in order to melt all of the xylitol. The mixture was then cooled to 92° C.

An additional 1.0 kg of coarse xylitol, preheated to 45° C., was admixed. Immediately after this, the following premixed composition was added with rapid mixing:

| xylitol | 1.0 kg; and |

| | |
|---|---|
| flavoring | 0.1731 kg. |

An additional 5.0 kg of pre-heated coarse xylitol was added with rapid mixing to form a homogeneous mixture (ratio of molten xylitol to crystalline xylitol of @0.99). The mixing step was carried out so that, at the conclusion of mixing, the mixture had a temperature of at least 60° C.

The ingredients were then cooled to 45° C. to 50° C. However, the mixture formed was somewhat sticky and very difficult to work with a traditional drop roller machine. The candy pieces formed stuck to each other and had poor dimensional stability so they could not maintain their shape.

EXAMPLE 5

An initial mixture was formed as follows:

| | |
|---|---|
| water | 6.2 kg; |
| Lactitol | 18.4 kg; |
| xylitol | 1.9 kg; and |
| glycerol monostearate | 0.09 kg. |

The initial mixture was heated to 175° C., and cooled in a vacuum to 120° C. The mass was then transferred to a heating table, and allowed to cool to 110° C. 5.0 kg of coarse xylitol was added while mixing the ingredients, and while maintaining the mixture at a temperature over 95° C. in order to melt all of the xylitol. The mixture was then cooled to 92° C.

An additional 1.0 kg of coarse xylitol, preheated to 45° C., was admixed. Immediately after this, the following premixed composition was added with rapid mixing:

| | |
|---|---|
| xylitol | 1.0 kg; |
| molten coconut fat | 0.2 kg; and |
| flavoring | 0.1731 kg. |

An additional 5.0 kg of pre-heated coarse xylitol was added with rapid mixing to form a homogeneous mixture (ratio of molten xylitol to crystalline xylitol of @0.99). The mixing step was carried out so that, at the conclusion of mixing, the mixture had a temperature of at least 60° C.

The ingredients were then cooled to 45° C. to 50° C. and worked with a traditional drop roller machine to obtain the desired candy shapes. The caramel shapes obtained are non-sticky and maintain their shape well.

EXAMPLE 6

The following ingredients were combined to form an initial mixture:

| | |
|---|---|
| water | 6.2 kg; |
| isomalt | 18.4 kg; |
| xylitol | 1.9 kg; and |
| glycerol monostearate | 0.09 kg. |

The initial mixture was heated to 175° C., and cooled in a vacuum to 120° C. The mass was then transferred to a heating table, allowed to cool to 110° C., and 5.0 kg coarse xylitol was added while mixing. The mixture was held at a temperature in excess of 95° C. in order to ensure that the xylitol melted. The mass was then cooled to 92° C. 1.0 kg of coarse xylitol preheated to 45° C. was admixed. Immediately following the addition of the preheated xylitol, the following premixed composition was added with rapid mixing:

| | |
|---|---|
| xylitol | 1.0 kg; |
| molten coconut fat | 0.2 kg; and |
| flavoring | 0.1731 kg. |

An additional 7.35 kg of coarse xylitol, preheated to 45° C., was combined with rapid mixing to form a homogeneous composition (ratio of molten xylitol to crystalline xylitol of @0.99). Mixing was carried out so that, at the conclusion of the mixing step, the mass was at a temperature of at least 60° C.

The composition was then cooled to 45° C. to 50° C., and worked with a traditional drop roller machine into candy pieces having the desired shape. The candy "centers" obtained were non-sticky and maintained their shape well.

From the foregoing, it is clear that by careful control of the temperature and the quantities of xylitol combined in a stepwise fashion with other sugar alcohols, that hard candies having reduced tack and improved dimensional stability can be formed. From the above teachings, it is apparent that many modifications and variations of the present invention are possible. It is therefore to be understood that the invention may be practiced otherwise than as specifically described.

I claim:

1. A process for producing xylitol-containing confectionery products, comprising the steps of:
   preparing a first mixture comprising 2%-10% by weight of xylitol, and 45%-70% of at least one other sugar alcohol;
   heating said first mixture to at least 120° C.;
   mixing said first mixture held at a temperature between about 110° C.-120° C. with about 10%-20% by weight of coarse xylitol to form a second mixture, the temperature of said first mixture when combined with said coarse xylitol being maintained sufficiently high so said first mixture remains molten during mixing;
   cooling said second mixture to about 92° C.;
   mixing 2%-10% by weight xylitol with said second mixture held at about 92° C. to form a third mixture;
   mixing a sixth composition comprising 2%-10% by weight xylitol with said third mixture to form a fourth mixture; and
   mixing 10%-20% of coarse xylitol with said fourth mixture to form a fifth mixture;
   wherein said percentages by weight have been calculated by the weight of said fifth mixture;
   said process further comprising forming pieces of candy from said fifth mixture.

2. A process according to claim 1, wherein said sixth mixture further comprises 0.5% by weight of fat and flavoring, wherein said percentages by weight have been calculated from the weight of said fifth mixture.

3. A process according to claim 1, wherein said pieces of candy are formed into desired shapes by use of a drop roller machine.

4. A process according to claim 1, wherein said xylitol added to said third, fourth, and fifth mixtures is preheated to 45° C.

5. A process according to claim 1, wherein said sixth mixture is preheated to 45° C. prior to combination with said third mixture.

6. A process according to claim 1, wherein said first mixture is heated to about 170° to 175° C. prior to said mixing and cooling steps.

7. A process according to claim 6, wherein the ratio of crystalline xylitol added to said xylitol in said molten mixture is between 0.3 and 2.14.

8. A process according to claim 6, wherein the ratio of crystalline xylitol added to said xylitol in said molten mixture is between 0.85 and 0.99.

9. A process according to claim 1, wherein said second, third, fourth, and fifth mixtures are maintained at a temperature between about 60° C. and about 92° C. during mixing.

* * * * *